Oct. 26, 1965  G. H. MULLER  3,213,958
VEHICULAR POWER PLANT
Filed April 14, 1964  4 Sheets-Sheet 1
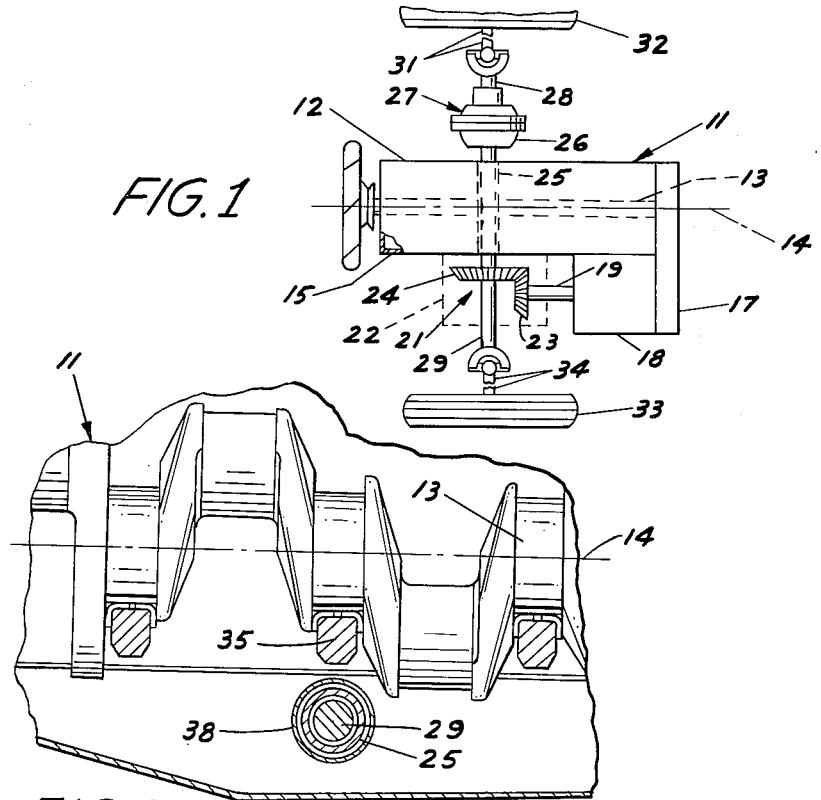
FIG. 1
FIG. 2
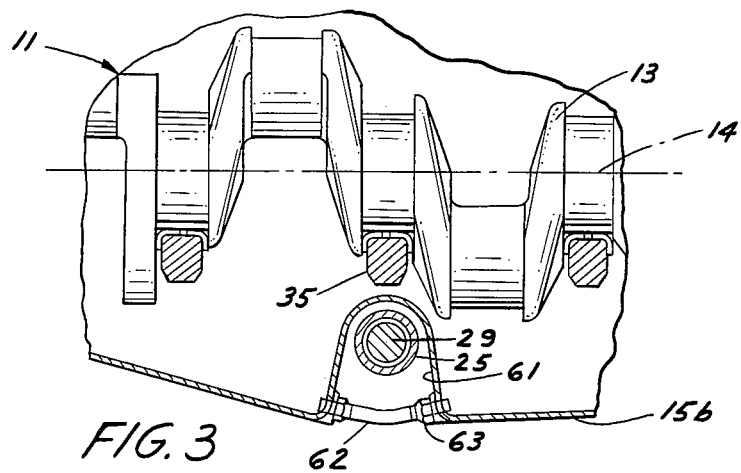
FIG. 3
INVENTOR.
GEORGE H. MULLER
BY John R. Faulkner
Jerry G. Beck
ATTORNEYS

United States Patent Office 3,213,958
Patented Oct. 26, 1965

3,213,958
VEHICULAR POWER PLANT
George H. Muller, Northville, Mich., assignor to Ford Motor Company, Dearborn, Mich., a corporation of Delaware
Filed Apr. 14, 1964, Ser. No. 359,619
12 Claims. (Cl. 180—55)

This invention relates to vehicular power plants and more particularly to an improved arrangement for mounting an engine, transmission, and differential in a motor vehicle.

In conventional motor vehicles, a longitudinally extending engine drives a separate multispeed transmission unit providing two or more speed ratios. The transmission power output is then directed through a drive shaft to a combination speed reducing and differential unit which divides the torque and directs the same to a pair of axle shafts. As the drive shaft extends underneath the vehicle body, the floor pan has a tunnel to accommodate the drive shaft sections.

The present trend towards compact vehicles generally calls for a reduction of the height of the vehicle body without decreasing interior body dimensions. One way of accomplishing this is by relocating the vehicle drive shaft to eliminate the objectionable tunnel in the floor pan. In recent years, automotive engineers have designed a so-called packaged power unit for vehicles wherein the engine, transmission, and differential are combined into one assembly. This packaged power unit is installed in the front or rear of the vehicle passenger compartment to drive corresponding front or rear road wheels, thereby eliminating the driveline components underneath the floor pan.

Experience has shown that the installation of a packaged power unit in a motor vehicle may result in complex engineering problems that affect the performance and operation of the vehicle.

A combined power unit has the inherent disadvantage of high weight concentration. Although the body design can be altered to accommodate the mounting of this power unit, proper distribution of weight with respect to the longitudinal center axis of the vehicle is not readily achieved. An unbalanced suspension of large mass in a vehicle may set up undesirable vibration and effect structural weaknesses in the vehicle body. Size limitations in engine compartments of compact vehicles do not usually permit the differential portion of these power units to be positioned on the center axis of the vehicle. Thus, different length axle shafts are required to connect the power output to laterally spaced left and right drive wheels. As a consequence, the independent suspension and steering components for each road wheel are not readily interchangeable. This substantially increases the design and maintenance costs for compact vehicles having packaged power units.

The present invention is directed to the provision of an automotive power unit having optimum equalized distribution of suspended mass when mounted in a vehicle.

In the preferred embodiment of this invention, the transmission is mounted on one side of a conventional longitudinally extending engine. The differential is split into a differential input unit and a differential output unit with the input unit in longitudinal alignment with the transmission. The differential output unit is mounted on the other side of the engine and connected to the input unit by a cross sleeve shaft. Thus, one of the pair of output shafts connecting the differential output unit with drive wheels has to extend back to the one side of the engine. This output shaft is coaxially mounted with and housed in the cross sleeve shaft to universally connect with an axle shaft driving one of the road wheels. The other output shaft is relatively short and extends in a direction opposite of the direction of the one output shaft to universally connect to an equal length axle shaft to drive the other road wheel.

The differential input and output units may be directly or resiliently supported from the engine or from resilient engine mounts attached to the vehicle body structure, and the cross sleeve shaft and the one output shaft extend through the oil pan of the engine in close proximity to the main bearing supporting the crankshaft of the engine. This will permit the reduction of the over-all height of the engine compartment housing the power unit and also assure that the longitudinal position of the mass of the power unit is substantially coincident with the axis of the driving road wheels.

It is a prime purpose of this invention to substantially equally distribute the weight of the power unit with respect to the longitudinal center axis of the vehicle.

It is a further object of this invention to provide a power unit that permits the use of equal length axle shafts to connect the power unit with the laterally spaced driving wheels of the vehicle.

It is still a further object of this invention to provide a power unit in which the longitudinal position of the mass of the engine is substantially coincident with the axis of the driving wheels.

Other objects and advantages of this invention will be made more apparent as this description proceeds, particularly when considered in connection with the accompanying drawings, wherein:

FIGURE 1 is a diagrammatic view of a power unit assembly of this invention depicting its relationship to the driving wheels;

FIGURE 2 is a fragmentary side elevational view of the engine of the vehicle power unit provided with a pierced oil pan and illustrating the relationship of a cross sleeve shaft that connects the differential input and output units of the power unit to the crankshaft of the engine;

FIGURE 3 is a fragmentary side elevational view of the vehicle engine of FIGURE 2 modified by incorporating a hat-type oil pan;

Figure 5:
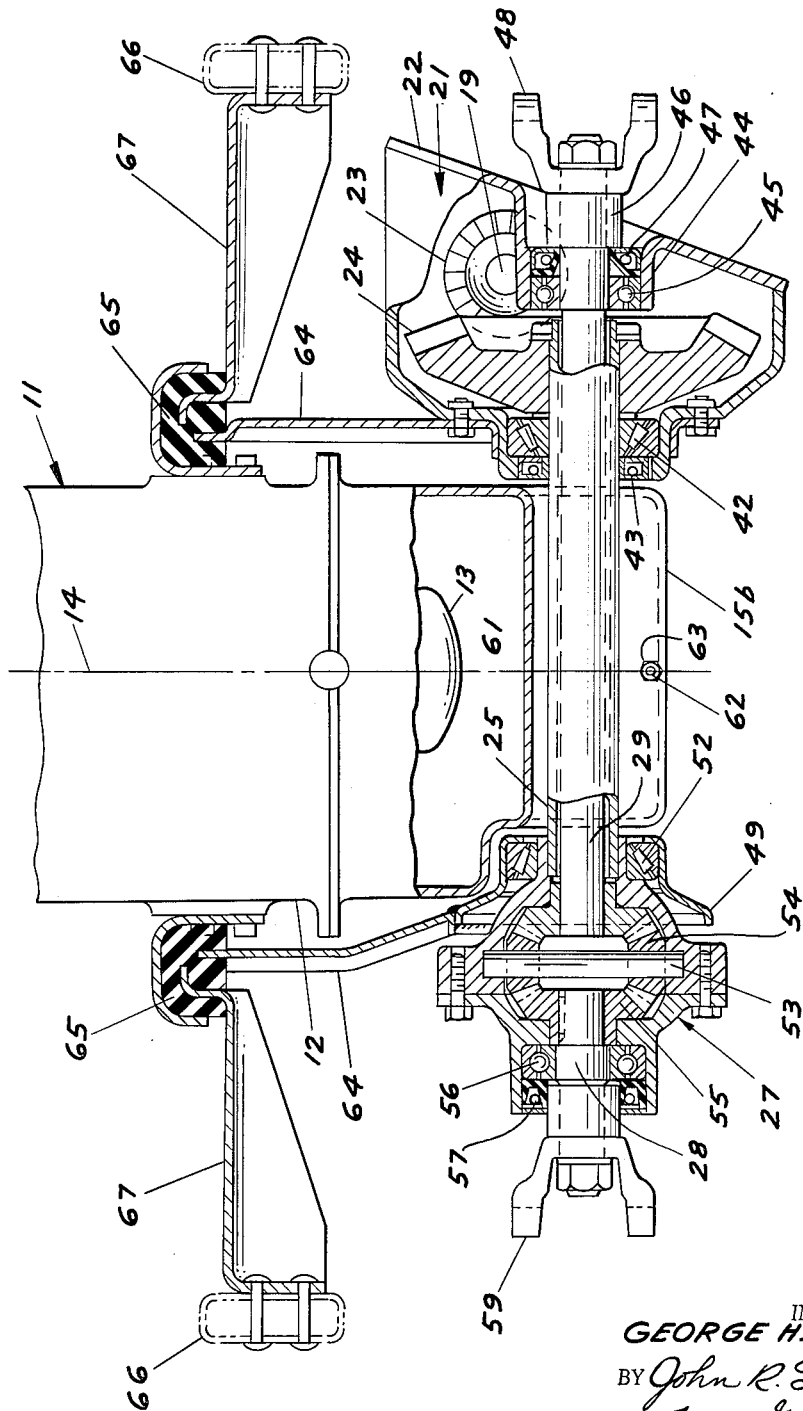
Figure 6:
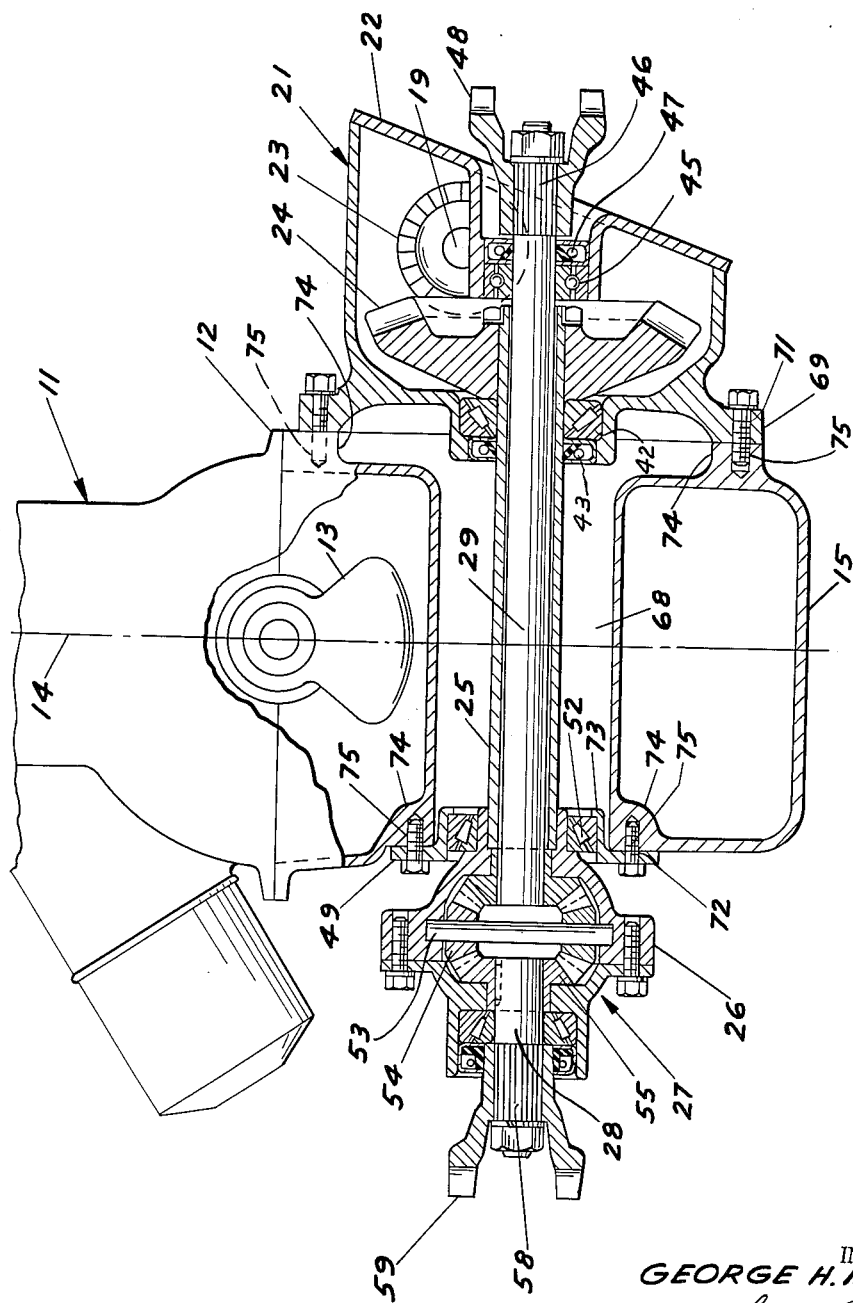

FIGURE 5 is a front cross sectional view of a portion of the power unit depicting a second embodiment of this invention that shows a hat-type oil pan and also the differential input and output units resiliently supported from the vehicle frame; and, FIGURE 6 is a front cross sectional view of a portion of the power unit depicting a third embodiment of this invention that shows a cast oil pan and also the differential input and output units bolted to the engine block and oil pan.

Referring now to the drawings, in FIGURE 1 is disclosed a preferred embodiment of the present invention incorporated in a front wheel drive automobile having a conventional automotive engine generally designated as 11. The engine 11 comprises an engine block 12 supporting a crankshaft 13 on its longitudinally extending center axis 14. An oil pan 15, as best seen in FIGURES 2 through 6, is attached to the underside of the engine block 12 to provide a reservoir for engine oil.

A transmission 16 is mounted on one side of the engine 11. Power is transmitted from the crankshaft 13 of the engine 11 to the transmission 16 through a transfer drive unit 17. This transfer drive unit 17 is not illustrated in any specific form as it is conventional and may take any of several forms as, for example, a conventional chain drive.

The transmission 16 is contained in a transmission housing 18 that may be bolted to or integrally formed with the engine block 12. Again, the transmission 16 is conventional and preferably is an automatic type embodying a torque converter and a gear unit with control means for effecting an automatic shift from one gear ratio to another. The output shaft (not shown) of the transmission 16 is coupled to an input shaft 19 to transmit power to a differential input unit 21 housed in a casing 22 (the outline of which is shown in dot-and-dash lines in FIGURE 1). The casing 22 is attached to one side of the engine block 12.

The end of the input shaft 19 extending into the casing 22 carries a bevel pinion 23. The teeth of the pinion 23 are in mesh with the teeth of a ring gear 24 mounted on one end of a tubular cross sleeve shaft 25 so that rotary motion from the input shaft 19 is transmitted to the cross sleeve shaft 25. The cross sleeve shaft 25 extends through the oil pan 15 of the engine 11. The other end of the shaft 25 supports a two-piece bolted spider body 26 of a differential output unit 27, the detailed structure of which will be hereinafter discussed.

The differential output unit 27 is connected to a pair of output shafts 28 and 29 extending outwardly therefrom in opposite directions. One output shaft 28, which is relatively short, is universally connected to one suspended axle shaft 31 to drive one road wheel 32 on one side of the vehicle. The other output shaft 29 extends laterally in an opposite direction of the first output shaft 28 to drive the other road wheel 33 on the other side of the vehicle. The center portion of the output shaft 28 is coaxial with and housed in the cross sleeve shaft 25. The output shaft 28 extends beyond the end of the cross sleeve shaft 25 through the casing 22 to universally connect with a second suspended axle shaft 34 driving road wheel 33.

The various embodiments of the oil pan 15 and the specific arrangements of the gearing in the differential input and output units 21 and 27 will be better understood from the following description when viewed in conjunction with FIGURES 2 through 6.

Figure 4:
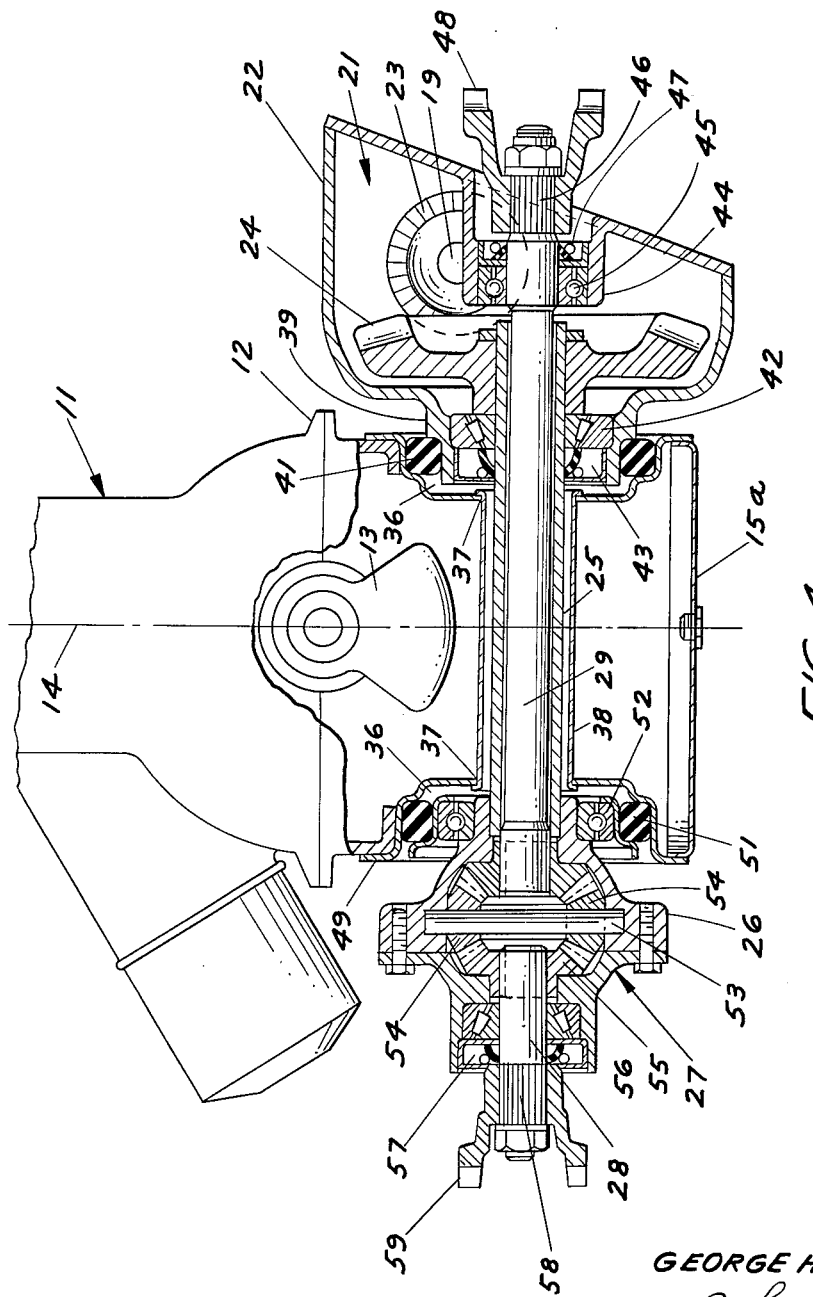
FIGURE 4 is a front cross sectional view of a portion of the power unit depicting one embodiment of this invention that shows a pierced oil pan and also the differential input and output units resiliently supported from the oil pan.

The oil pan 15 may be of a pierced type 15a as shown in FIGURES 2 and 4 or of a hat type 15b as shown in FIGURES 3 and 5.

As best seen in FIGURES 2 and 3, the cross sleeve shaft 25 extends through the oil pan 15 beneath one of the main bearings 35 of the engine 11 which is located near the center of gravity of the engine 11.

The pierced-type oil pan 15a of FIGURE 4 has a recessed portion 36 on each side. The recessed portions 36 are provided with apertures 37 to receive the flanged ends of a tubular member 38 extending through the oil pan 15a. The cross sleeve shaft 25 has its main center portion positioned in the tubular member 38.

The casing 22 is provided with an external hub portion 39 extending into the recessed portion 36 on one side of the oil pan 15a. A resilient ring 41 disposed between the outside diameter of the external hub portion 39 and the recessed portion 36 supports the casing 22 from the oil pan 15b. The cross sleeve shaft 25 is journaled in a bearing 42 having its outer race secured to the inside diameter of the hub portion 39. A suitable oil sealing device 43 is placed on the tubular cross shaft 25 between the bearing 42 and the end face of the recessed portion 36 to retain lubricating oil within the casing 22. The ring gear 24 mounted on one end of the cross sleeve shaft 25 will mesh with the teeth of the bevel pinion 23 carried by the input shaft 19.

The outward side of the casing 22 has an internal hub 44. A bearing 45 mounted in the internal hub 44 journals the end of the output shaft 29 which terminates in a splined portion 46. A second oil sealing device 47 is juxta-positioned to the bearing 45 to seal the other side of the casing 22. A yoke 48 carried by the splined portion 46 forms a part of a universal joint between axle shaft 34 and output shaft 29.

The recessed portion 36 on the other side of the oil pan 15a (on the left side of FIGURE 4) receives a cup-shaped bearing retainer 49 that is resiliently supported from the oil pan 15a by a resilient ring 51. The bolted two-piece spider body 26 is journaled by a bearing 52 mounted in bearing retainer 49. This spider body 26 has mounted therein a diametrically extending pinion shaft 53 that supports a pair of freely rotatable opposed beveled pinions 54. The beveled pinions 54 are in mesh with a similar set of beveled pinions 55 mounted on keyed ends of the output shaft 28 and output shaft 29, respectively. The output shaft 28 journals in a bearing 56 carried by the spider body 26. A conventional oil sealing device 57 is mounted adjacent the outward face of the bearing 56. The output shaft 28 extends outwardly of the spider body 26 and terminates in a splined portion 58 to which a yoke 59 is attached. This yoke 59 is part of a second universal joint connecting the output shaft 28 to the other axle shaft 31 driving the road wheel 32.

In FIGURES 3, 5 and 6, further embodiments of this invention are illustrated. As the differential input unit 21 and differential output unit 27 in FIGURES 3, 5 and 6 are substantially identical with the units shown in FIGURES 2 and 4, the descriptions thereof are not repeated. The element numbers applied to differential component parts in FIGURES 2 and 4, however, are repeated in FIGURES 3, 5 and 6 to identify like parts.

In FIGURES 3 and 5, the oil pan is of a hat-type construction designated as 15b. The oil pan 15b has a laterally extending inverted U-shaped tunnel 61 extending upwardly from its bottom surface to partially encompass the output shaft 29 and the cross sleeve shaft 25. As the oil circulation in the oil pan 15b is impeded by the tunnel 61, flexible connecting tubes 62 are provided at the low points of the oil pan 15b to place the separated portions thereof in communication with each other. The connecting tubes 62 can be readily removed from the oil pan 15b by loosening their respective end fittings 63.

In FIGURE 5, an alternate method of supporting the differential input unit 21 and the differential output unit 27 of this invention is illustrated. The casing 22 and the spider body 26 are supported by vertical hangers 64. The upper ends of the hangers 64 are retained in the resilient portions of engine supports 65, while the lower ends are directly affixed to the casing 22 and bearing retainer 49, respectively. The engine supports 65 are conventionally attached to the vehicle frame 66 by a bracket 67.

The main advantage of utilizing vertical hangers 64 lies in the provision for resiliently supporting the differential units independently from the engine components. This will substantially reduce the transmission of vibrations from the differential to the engine 11 and vice versa. Also, the hat-type oil pan 15b as shown in FIGURES 3 and 5 allows the differential components to be disassembled from the power unit for repair without removing the oil pan 15b from the engine 11. In order to remove the differential units from the power unit, the tube fittings 63 have to be unscrewed and the input shaft 19 has to be disconnected from the transmission 16.

In FIGURE 6 is seen a further embodiment of this invention in which the casing 22 and the bearing retainer 49 are directly bolted to the engine block 12 and the oil pan 15. In this embodiment, the oil pan 15 is cast a laterally extending tubular tunnel 68 to provide clearance for the cross sleeve shaft 25 and the output shaft 29.

The casing 22 is modified to include a flange 69 provided with a plurality of bores 71. The bearing retainer 49 also has holes 72 extending through its outer flange 73. The oil pan 15 and the engine block 12 are cast with bosses 74 provided with blind tapped holes 75 to permit bolting of the casing 22 and the bearing retainer 49 directly to the engine 11 and oil pan 15 so as to effect a unitary power unit. This construction can be effectively utilized where vibration set up by the differential components and the engine are at a minimum or substantially in phase.

It can be readily seen that the pierced and hat-type oil pans 15a and 15b permit the laterally extending cross sleeve shaft 25 interconnecting the differential input unit 21 and differential output unit 27 to be located underneath the main bearing 35 supporting the engine crankshaft 13. This permits the concentrated mass of the power unit to be substantially balanced above the road wheels 32 and 33. Further, the engine can be lowered in the engine compartment as no clearance for the cross sleeve shaft 25 underneath the engine 11 is required. This will reduce the height of the hood of the vehicle to improve driver visibility.

The splitting of the differential components into an input and an output unit disposed on opposite sides of the engine permits the concentrated mass of the power unit to be maintained substantially in balance with respect to the longitudinal center axis 14 of the vehicle. The installation of output shafts 28 and 29 in the manner disclosed results in a symmetrical arrangement that allows the use of equal length axle shafts 31 and 34 and corresponding symmetrical suspension and steering components for each axle shaft.

It is to be understood that the combination of the various means for supporting the differential components and the various oil pan configurations are readily interchangeable to suit specific engineering requirements and are not to be construed as limited to the combination shown in each figure of the drawing.

It is to be further understood that various changes and modifications may be made from the construction shown and described without departing from the spirit and scope of the invention as defined in the appended claims.

What is claimed as new is:

1. In a power unit mounted in a vehicle, an engine, a tranmission means mounted on said engine and operatively connected thereto, a differential input unit rotatably connected by an input shaft to said transmission means, said differential input unit being supported on one side of the engine, a differential output mounted on the other side of said engine, a cross shaft extending along an axis lying in a plane normal to the plane containing the main center line of said engine to connect said differential input unit with said differential output unit, and a pair of output shafts rotatably connected to said differential output unit and extending in oppositely disposed directions therefrom.

2. In a power unit mounted in a vehicle, an engine, a transmission means operatively connected thereto, a differential input unit rotatably connected by an input shaft to said transmission means, said differential input unit and said transmission means axially aligned and being supported on one side of said engine, a differential output unit mounted on the other side of said engine, a cross shaft extending perpendicularly to and spaced below the main center line of said engine to connect said differential input unit with said differential output unit, and a pair of output shafts rotatably connected to said differential output unit and extending in oppositely disposed directions, one of said pair of output shafts extending to said one side of the engine.

3. In a vehicular power unit mounted within the engine compartment of a motor vehicle, an engine comprising an engine block and an oil pan attached thereto, transmission means mounted on said engine block and operatively connected to said engine, a differential input unit operatively connected by an input shaft to said transmission means, said differential input unit and transmission means axially aligned and supported on one side of the engine, a differential output unit mounted on the other side of said engine block, a cross shaft extending laterally through said oil pan to connect said differential input unit with said differential output unit, and a pair of output shafts operatively connected to said differential output unit and extending in oppositely disposed directions therefrom, one of said pair of output shafts extending through said oil pan to said one side of the engine.

4. In a vehicular power unit mounted within the engine compartment of a motor vehicle, an engine comprising an engine block and an oil pan connected to the bottom of said engine block, transmission means operatively connected to said engine, differential input gearing, means axially aligning and supporting said transmisson means and said differential input gearing on one side of said engine block on an axis laterally displaced from a vertical plane containing the center line of said engine, an input shaft operatively connecting said transmission means to said differential input gearing, differential output gearing positioned on and supported from the other side of said engine block on an axis laterally displaced in the other direction from said vertical plane, a cross shaft extending laterally with respect to said vertical plane and operatively interconnecting said differential input gearing and said differential output gearing, said cross shaft extending through said oil pan, a pair of output shafts operatively connected to said differential output gearing, one of said ouput shafts passing from said differential output gearing on the other side of said engine block through said oil pan to said one side of the engine block, the other of said output shafts extending in a direction opposite from said one of said pair of output shafts.

5. In a vehicular power unit mounted within the engine compartment of a motor vehicle, a longitudinally extending engine comprising an engine block, a longitudinally extending crankshaft, and at least one bearing intermediate the ends of said crankshaft rotatably supporting the latter within said engine block, on oil pan attached to the bottom of said engine block, transmission means operatively connected to said engine, differential input gearing, means axially aligning and supporting said transmission means and said differential input gearing on one side of said engine block on an axis laterally displaced in one direction from the longitudinal axis passing through the center of said engine, an input shaft operatively connecting said transmission means to said differential input gearing, a differential output gearing positioned and supported on the other side of said engine block and lying on an axis laterally displaced in the other direction from the longitudinal axis passing through the center of said engine, a cross sleeve shaft extending laterally of said engine block and operatively connecting said differential input gearing to said differential output gearing, said cross sleeve shaft extending through said oil pan underneath said main bearing, a pair of output shafts operatively connected to said differential output gearing and extending in laterally opposite directions therefrom, one of said pair of output shafts extending from said other side of said engine block through said cross sleeve shaft to said one side of the engine block, said one of the pair of output shafts being coaxial with said cross sleeve shaft.

6. The vehicular power unit as described in claim 5 and which is further characterized in that said oil pan has a tunnel portion and an oil reservoir portion, said tunnel portion accommodating said cross sleeve shaft and said one of said pair of output shafts extending through said oil pan.

7. The vehicular power unit as described in claim 5 and which is further characterized in that said oil pan has a pair of apertures, each aperture being in opposite side walls of said oil pan, said apertures being interconnected by a tubular receiving member extending through said oil pan, said tubular receiving member receiving a portion of said cross sleeve shaft and said one of the pair of output shafts.

8. The vehicular power unit as described in claim 5 and which is further characterized in that said oil pan is formed with an inverted U-shaped tunnel portion extending inwardly from its bottom surface, said tunnel portion receiving a portion of said cross sleeve shaft and said one of the pair of output shafts.

9. In a motor vehicle, a vehicular power unit, a pair of laterally spaced driving wheels juxtapositioned to said power unit, said power unit comprising an engine having an engine block, said engine including a longitudinally extending crankshaft, at least one main bearing intermediate the ends of said crankshaft rotatably supporting the crankshaft within said engine block, and an oil pan attached to the botttom of said engine block, transmission means operatively connected to said crankshaft, differential input gearing, means axially aligning and supporting said transmission means and said differential input gearing on one side of said engine block upon an axis laterally displaced in one direction from the longitudinal axis passing through the center of said engine, an input shaft operatively connecting said transmission means to said differential input gearing, differential output gearing positioned on the other side of said engine block and lying on an axis laterally displaced in the other direction from the longitudinal axis passing through the center of said engine, a cross sleeve shaft extending laterally of said engine block and operatively interconnecting said differential input gearing and said differential output gearing, said cross sleeve shaft extending through said oil pan underneath said one main bearing, a pair of output shafts, each output shaft having one end operatively connected to said differential output gearing and extending in laterally opposite directions therefrom, one of said pair of output shafts extending from said other side of the engine block through said oil pan, the other ends of each of said pair of output shafts being equally distant from the longitudinal axis passing through the center of said engine, and a pair of equal length axle shafts, each axle shaft being universally connected to the other end of each of said pair of output shafts to connect said output shafts to said driving wheels.

10. In a vehicular power plant mounted within the engine compartment of a motor vehicle, a longitudinally extending engine comprising an engine block and an oil pan attached to the bottom of said engine block, transmission means operatively connected to said engine, differential input gearing, a casing for said differential input gearing, means axially aligning and supporting said transmission means and said casing on one side of said engine block on an axis laterally displaced in one direction from the longitudinal axis passing through the center of said engine, an input shaft operatively connecting said transmission means to said differential input gearing, differential output gearing including a spider body positioned on the other side of said engine block lying on an axis laterally displaced in the other direction from the longitudinal axis passing through the center of said engine, said oil pan having a recessed portion on each side thereof, said casing being received in the recessed portion on one side of said oil pan and being resiliently supported therefrom, a bearing retainer in the recessed portion on the other side of said oil pan, said bearing retainer being resiliently supported from said recessed portion, said differential output gearing journaled in said bearing retainer, a cross sleeve shaft extending laterally of said engine block and operatively connecting said differential input gearing to said differential output gearing, said cross sleeve shaft extending through said oil pan and extending outwardly of each of said recessed portions, a pair of output shafts, one of said pair of output shafts having one end connected to said differential output gearing and extending therefrom to the other side of said engine block through said cross sleeve shaft, the other end of said one of said pair of output shafts being journaled in said casing, the other of said pair of output shafts having one end connected to said differential output gearing and the other end rotatably supported by the spider body of said differential output gearing.

11. In a motor vehicle, a frame, a vehicular power unit, a pair of laterally spaced driving wheels juxtapositioned to said power unit and supported from said frame, resilient mounts on said frame supporting said power unit, said power unit comprising an engine having an engine block, said engine including a longitudinally extending crankshaft, at least one main bearing intermediate the ends of said crankshaft rotatably supporting the crankshaft within said engine block, and an oil pan attached to the bottom of said engine block, transmission means operatively connected to said crankshaft, differential input gearing, means axially aligning and supporting said transmission means and said differential input gearing on one side of said engine block upon an axis laterally displaced in one direction from the longitudinal axis passing through the center of said engine, an input shaft operatively connecting said transmission means to said differential input gearing, differential output gearing positioned on the other side of said engine block and lying on an axis laterally displaced in the other direction from the longitudinal axis passing through the center of said engine, a cross sleeve shaft extending laterally of said engine block and operatively connecting said differential input gearing to said differential output gearing, said cross sleeve shaft extending through said oil pan underneath said main bearing, a pair of output shafts, each output shaft having one end operatively connected to said differential output gearing extending in laterally opposite directions therefrom, a casing partially enclosing said differential input gearing, one of said pair of output shafts extending from the other side of said engine block through said oil pan, the other end of each of said pair of output shafts being equally distant from the longitudinal axis passing through the center of said engine and being rotatably supported by said casing and said differential output gearing respectively, and a pair of hangers, each hanger having its upper end attached to the resilient portion of said resilient engine mounts, a bearing retainer rotatably supporting said output gearing, the lower end of one of said hangers being attached to said casing and the lower end of the other of said hangers being attached to said bearing retainer to support said differential output gearing and said differential input gearing resiliently from the frame of said vehicle, and a pair of axle shafts, each axle shaft being universally connected to the other end of each of said pair of output shafts to connect the latter to said driving wheels.

12. In a motor vehicle, a vehicular power unit, a pair of laterally spaced driving wheels juxtapositioned to said power unit, said power unit comprising an engine having an engine block, said engine including a longitudinally extending crankshaft, at least one main bearing intermediate the ends of said crankshaft rotatably supporting the crankshaft within said engine block, and an oil pan attached to the bottom of said engine block, transmission means operatively connected to said crankshaft, differential input gearing, a casing encompassing said differential input gearing and secured to one side of said engine, means axially aligning and supporting said transmission means and said casing on one side of said engine block upon an axis laterally displaced in one direction from the longitudinal axis passing through the center of said engine, an input shaft operatively connecting said transmission means to said differential input gearing, a bearing retainer on the other side of said engine, differential output gearing rotatably supported by said bearing retainer on the other side of said engine block and lying on an axis laterally displaced in the other direction from the longitudinal axis passing through the center of said engine, said bearing retainer being secured to the other side of said engine, a cross sleeve shaft extending laterally of said engine block and operatively connecting said differential input gearing to said differential output gearing, said cross sleeve shaft extending through said oil pan underneath said main bearing, a pair of output shafts, each output shaft having one end operatively connected to said differential output gearing and extending in laterally opposite directions therefrom, one of said pair of output shafts extending from the other side of said engine block through said oil pan, the other end of each of said pair of output shafts being equally distant from the longitudinal axis passing through the center of said engine, and a pair of axle shafts, each axle shaft being universally connected to the other end of each of said pair of output shafts to connect the latter to said driving wheels.

References Cited by the Examiner

UNITED STATES PATENTS 3,052,313   9/62   Hooven _____ 180—42 X

FOREIGN PATENTS 267,936   10/27   Great Britain.
622,579   5/49   Great Britain.

BENJAMIN HERSH, *Primary Examiner.*